(12) United States Patent
Lepage et al.

(10) Patent No.: US 11,467,129 B2
(45) Date of Patent: Oct. 11, 2022

(54) NDT DATA REFERENCING SYSTEM

(71) Applicant: Olympus NDT Canada Inc., Québec (CA)

(72) Inventors: Benoit Lepage, L'Ancienne-Lorette (CA); Jean Gauthier, Quebec (CA)

(73) Assignee: Olympus NDT Canada Inc., Québec (CA)

(*) Notice: Subject to any disclaimer, the term of this patent is extended or adjusted under 35 U.S.C. 154(b) by 163 days.

(21) Appl. No.: 16/826,568

(22) Filed: Mar. 23, 2020

(65) Prior Publication Data
US 2021/0293757 A1 Sep. 23, 2021

(51) Int. Cl.
*G01N 29/26* (2006.01)
*G06N 7/00* (2006.01)
(Continued)

(52) U.S. Cl.
CPC ......... *G01N 29/069* (2013.01); *G01N 29/262* (2013.01); *G06K 19/0723* (2013.01);
(Continued)

(58) Field of Classification Search
CPC .............. G01N 29/069; G01N 29/262; G01N 2291/0258; G01N 2291/023; G01N 2291/267; G06N 7/005; G06K 19/0723
(Continued)

(56) References Cited

U.S. PATENT DOCUMENTS 6,859,757 B2   2/2005 Muehl et al.
7,848,905 B2 * 12/2010 Troxler ............... G08B 21/023
                                                            702/187
(Continued)

FOREIGN PATENT DOCUMENTS

WO   WO-2018208509 A1   11/2018
WO   WO-2021189132 A1    9/2021

OTHER PUBLICATIONS

"International Application Serial No. PCT/CA2021/050376, International Search Report dated May 27, 2021", 3 pgs.
(Continued)

*Primary Examiner* — Jacques M Saint Surin
(74) *Attorney, Agent, or Firm* — Schwegman Lundberg & Woessner, P.A.

(57) ABSTRACT

Systems and methods are disclosed for conducting an ultrasonic-based inspection. The systems and methods perform operations comprising: receiving, by one or more processors, data indicative of a detected tag on a specimen, the tag associated with one or more ultrasonic-based inspections that were previously performed on the specimen; retrieving, by the one or more processors, based on the detected tag, configuration data for a non-destructive testing (NDT) instrument, the configuration data being associated with the one or more ultrasonic-based inspections that were previously performed on the specimen; generating, by the one or more processors, new configuration data for the NDT instrument to perform a new inspection of the specimen at least in part using the received configuration data; and performing the new inspection of the specimen based on spatially positioning the NDT instrument relative to a position of the tag on the specimen.

22 Claims, 4 Drawing Sheets

(51) Int. Cl.
*G06K 19/07* (2006.01)
*G01N 29/06* (2006.01)

(52) U.S. Cl.
CPC ....... *G06N 7/005* (2013.01); *G01N 2291/023* (2013.01); *G01N 2291/0258* (2013.01); *G01N 2291/267* (2013.01)

(58) Field of Classification Search
USPC .......................................................... 73/598
See application file for complete search history.

(56) References Cited

U.S. PATENT DOCUMENTS

| | | | |
|---|---|---|---|
| 9,625,424 B2 * | 4/2017 | LePage | G01N 29/262 |
| 10,473,626 B2 * | 11/2019 | Leach | G01N 29/069 |
| 10,948,476 B2 * | 3/2021 | Troxler | G01C 21/005 |
| 2007/0095160 A1 | 5/2007 | Georgeson et al. | |
| 2017/0249588 A1 * | 8/2017 | Belstner | G06K 7/10128 |
| 2018/0329904 A1 * | 11/2018 | Gupta | G01M 5/0091 |
| 2019/0168787 A1 | 6/2019 | Messinger et al. | |

OTHER PUBLICATIONS

"International Application Serial No. PCT/CA2021/050376, Written Opinion dated May 27, 2021", 4 pgs.

* cited by examiner

NDT DATA REFERENCING SYSTEM

TECHNICAL FIELD

The present disclosure generally relates to a method and a system for conducting non-destructive testing/inspection (later as NDT/NDI).

BACKGROUND

Phased array ultrasonic testing (PAUT) is an advanced method of ultrasonic testing (UT) that has applications in industrial non-destructive testing (NDT). The Total Focusing Method (TFM) is a synthetic aperture beam forming technique that has been under active development in the NDT industry over the past decade. Common applications of these techniques are to find flaws in manufactured materials such as welds.

Single-element (non-phased array) probes, known technically as monolithic probes, emit a beam in a fixed direction. To test a large volume of material, a conventional probe must be physically moved or turned to sweep the scan beam through the area of interest.

In contrast, the beam from a PAUT probe can be moved electronically, without moving the probe, and can be swept through a wide volume of material at high speed. The beam is controllable because a PAUT probe is made up of multiple small elements, each of which can be pulsed individually at a computer-calculated timing, forming incidence angles. The term phased refers to the timing, and the term array refers to the multiple elements. A beam can be defined by a corresponding aperture; where the aperture can be defined by a portion or all of the elements of the PAUT probe.

During typical inspections of welds, multiple ultrasound beams are generated to define a single aperture or multiple apertures corresponding to various incidence angles. Acoustic scatterings from acoustic transmissions can be used to generate an image showing reflections (or diffractions) of the ultrasonic waves that are associated to defects within the scanned area in the test object. For weld inspection, the region of interest, or the scanned area, generally encompasses the weld and its surrounding area. For cases where the aperture is fixed and only the angles are changed, the images are called a sectoral scan or S-scan. For cases where the angle is fixed and only the aperture is moved, the images are called a linear scan or E-scan.

In an example, a scan plan can be established according to a standard, such as an international code "2010 ASME Boiler & Pressure Vessel Code, 2010 Edition, Section V—Nondestructive Examination". For example, the 2010 ASMF code mentioned above specifies a scan plan associated with a weld inspection includes a combination of a) instrumentation configuration including probe, wedge, and acquisition unit; b) acoustic setting, including, aperture size and position, focalization setting, beams angle, gating parameters and c) probe manipulation guideline, including probe to weld distance, maximum inspection speed.

Overview

In some implementations, a system and method is provided for conducting an ultrasonic-based inspection, such as providing assistance and automation to an ultrasonic scan plan and setup generation. The systems and methods perform operations comprising: receiving, by one or more processors, data indicative of a detected tag on a specimen, the tag associated with one or more ultrasonic-based inspections that were previously performed on the specimen; retrieving, by the one or more processors, based on the detected tag, configuration data for a NUT instrument, the configuration data being associated with the one or more ultrasonic-based inspections that were previously performed on the specimen; and generating, by the one or more processors, new configuration data for the NUT instrument to perform a new inspection of the specimen at least in part using the received configuration data.

The disclosure is generally discussed with a specific application to PAUT, TFM and/or full matrix capture (FMC) acquisition schemes. Similar techniques can be applied to other types of image acquisitions and/or other types of imaging, such as acqusition in plane waves (e.g., limited amount of massive insonifaction in transmission, and many elementary receptions) that do not result in TFM using the elementary A-Scans, eddy current, pulsed eddy current, magnetic flux leakage method, and conventional ultrasound.

The above overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various implementations discussed in the present document.

DETAILED DESCRIPTION

Figure 1:
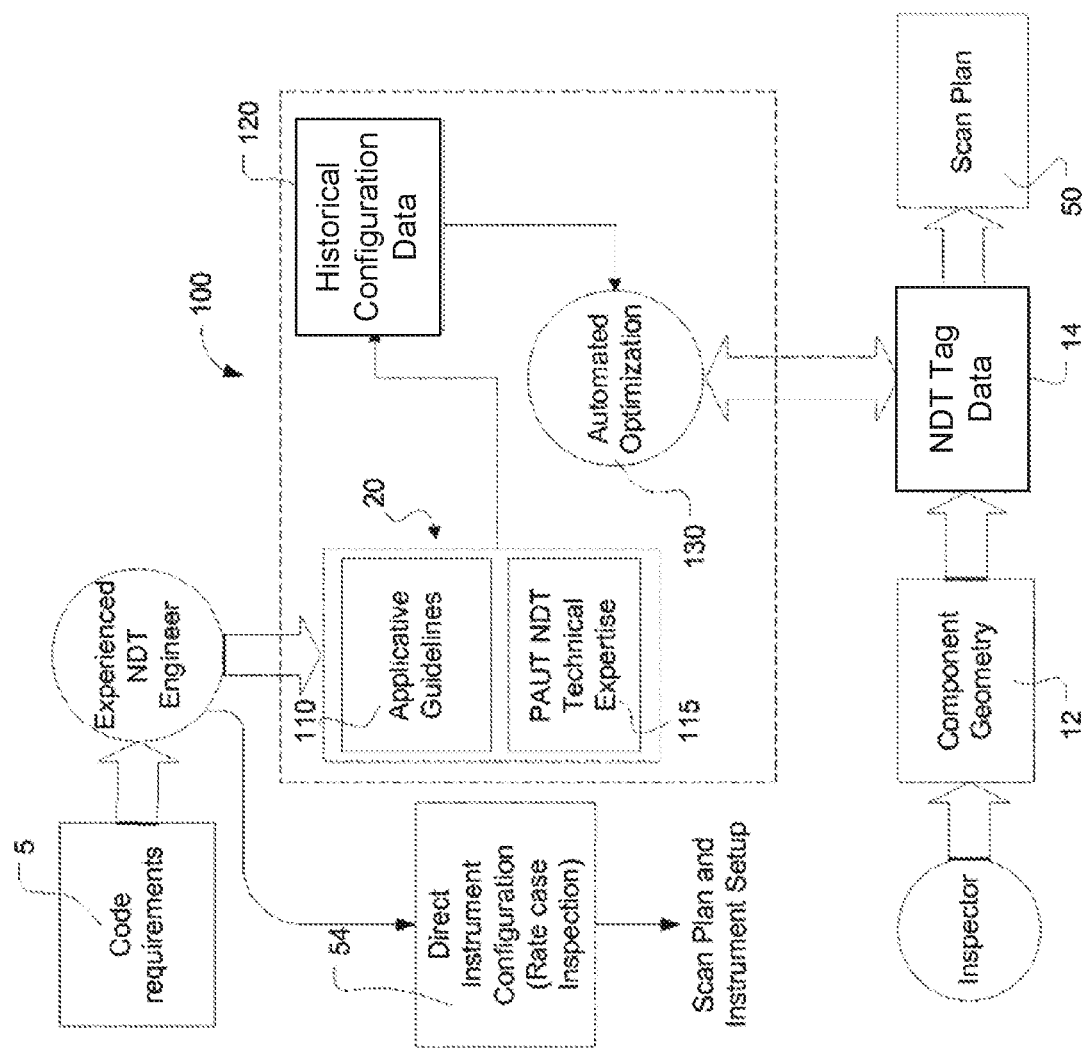
FIG. 1 illustrates an illustrative scan plan generation and inspection process, according to some implementations of the present disclosure.

In the following detailed description, reference is made to the accompanying drawings which form a part hereof, and which is shown by way of illustration-specific implementations in which the present disclosure may be practiced. These implementations, which are also referred to herein as "examples," are described in sufficient detail to enable those skilled in the art to practice the disclosure, and it is to be understood that the implementations may be combined, or that other implementations may be utilized and that structural, logical and electrical changes may be made without departing from the scope of the present disclosure. The following detailed description is, therefore, not be taken in a limiting sense, and the scope of the present disclosure is defined by the appended claims and their equivalents.

A recurring problem associated with weld inspection using phased array ultrasonic scans and TFM is that the combination of parameters that define the scan plan gets extremely complicated. Particularly, all the parameters in the scan plan could have vast range of selections which need to be tailored to the particular specimen under consideration, the particular flaw being targeted, or both. It is extremely difficult to have an individual trained in such a broad range of expertise as in phased array systems, phased array probes and wedges and in weld structure and flaws. In a typical scenario, a scan plan for TFM is created by setting the attributes for the various parameters according to the specimen and flaw under consideration. The scan plan is then executed by performing an inspection of the specimen, based on the scan plan parameters, using a probe. The inspection of the specimen produces an image of the flaw which is then analyzed. If any one of the parameters in the scan plan is not initially accurately set, the entire inspection may be flawed and may need to be re-performed using a different set of scan plan parameters. This introduces various inefficiencies and may waste time and resources associated with performing TFM based inspections.

In some cases, the same specimen is inspected over a long period of time (e.g., a series of scans are performed at various times over a long duration, such as at various points in the lifespan of the specimen) to determine whether any flaws develop or to analyze how particular flaws change over time. Each time the specimen is inspected (e.g., every month, every two months, every year, every two years, every decade, etc.), a different entity may perform the inspection and may or may not have access the previous inspection information. As a result, a new scan plan has to be developed from scratch for each inspection of the specimen. Even if the same scan plan parameters are used over time, a small variation in positioning of the NUT instrument can provide inconsistent information about the flaws in the specimen. These inconsistencies and repetition of work in relation to inspecting the same specimen over time leads to unnecessary costs, wastes of time and inaccurate analysis of flaws in the specimen.

The present disclosure includes various techniques to improve and enhance the way in which scan plans and inspections are conducted for the same or similar specimen over time. Specifically, the present disclosure provides a database that stores historical configuration data, such as scan plan parameters and NDT instrument positioning information, for one or more ultrasonic-based inspections performed for a particular specimen. The NDT instrument may include one or more components and circuitry for performing non-destructive testing of a specimen and may include a camera, an RFID reader, a set of probes, a user interface, or any combination thereof. The NDT instrument may refer to a unit that is detachably coupled to at least one probe. The historical configuration data can be stored in a standardized format so that any entity can access and interpret the data for performing an inspection in the same way. The specimen is associated with a tag, for example, by permanently affixing, attaching, associating with, or placing the tag on the specimen. An NDT instrument can access the tag or receive data indicative of the tag and such tag information can be used to access the database from which the historical configuration data for the specimen is retrieved. Using the historical configuration data retrieved for the specimen, a new inspection of the specimen can be performed in a consistent manner with the prior inspections. In some cases, the NDT instrument is automatically or manually positioned relative to the tag to perform the inspection according to the positioning and path previously followed to inspect the instrument, such as by capturing an image of the tag, determining a three-dimensional (3D) position of the tag in 3D space, and setting a starting position of the NDT instrument based on a starting position specified in the historical configuration information and the 3D position of the tag. In this way, a current inspection can be performed in an almost identical manner as one or more previous inspections of the same specimen. This leads to less work in generating a new scan plan and reduces inaccuracies in placement of the NDT instrument to perform the inspection.

In some cases, the NDT instrument includes a camera. The camera can capture an image of the specimen and find a tag on the specimen. The camera images of the tag can be analyzed automatically using object recognition to extract the tag from the images and retrieve unique codes associated with the tag. The unique codes can be provided to the database to retrieve the historical configuration information for the specimen. In some cases, the tag is a radio-frequency identification (RFID) tag which can be read by an RFID reader on the NDT instrument or by an RFID reader of an operator of the NDT instrument. The RFID reader obtains the unique codes of the tag by reading the RFID tag and can use those codes to access the historical configuration information for the specimen. In cases where an RFID reader is used, the NDT instrument may not need the camera to read the tag but may use the camera to align itself relative to the tag to a point of origin of a previous inspection.

In some implementations, after the historical configuration information is retrieved, position and path information can be accessed from the historical configuration information for a previously performed inspection of the specimen. The NDT instrument, using imaging data acquired from the camera, can align itself automatically relative to the tag to position itself in three-dimensional (3D) space at the same point of origin as that which was used in the previously performed inspection. For example, the historical information can specify a point of origin for the inspection in 3D space relative to the tag or using GPS information. The NDT instrument can then search for the GPS location or for the point of origin on the specimen relative to the tag and move itself to that starting position. From there, the NDT instrument can retrieve additional path points for the prior inspection and follow those same path points to perform the inspection along the specimen.

In some cases, the results of the inspection can be compared in real-time with results obtained from the database from one or more prior inspections. Based on the comparison, an analysis of a previously detected flaw (e.g., indicating how the flaw is developing, such as whether the flaw is getting worse or staying the same) or detection of a flaw not previously found in the prior inspections can be performed. In some implementations, future flaw data can be predicted for the specimen by applying one or more models to the historical configuration data, including results from prior inspections, and results from a current inspection. In some cases, while a new inspection is being performed the results of the inspection can be analyzed remotely. As an example, the results of the new inspection are continuously or periodically transmitted over the Internet or other network to a remote server. A remote user at a remote location relative to the location of the NDT instrument and the specimen analyzes the new inspection results as they are received and compares such results to an expected set of results or historical results. The remote user may detect an error in the inspection and, in real-time, communicate with a field operator of the NDT instrument about the error to make adjustments to the scan plan. The field operator may adjust the new inspection or re-perform the inspection based on the instructions from the remote user. The inspection results may be automatically uploaded to a remote storage facility, such as a cloud server, as the inspection progresses or can be uploaded after completion of the new inspection (automatically or in response to user input confirming such an action via a displayed prompt).

Referring to FIG. 1, the present disclosure, herein referred to as a scan plan generator 100, is comprised of: applicative guidelines 110, a PAUT NDT or TFM technical expertise 115, historical configuration data 120, and an automated optimization process 130. Applicative guidelines 110 and expertise 115 together form a scan plan generating module 20.

The objective of scan plan generator 100 is to allow a user (e.g., a scan plan creator or inspector), who might have limited knowledge of PAUT NDT or TFM technical expertise 115 and/or code requirements 5, to generate a scan plan 50 and further a suitable instrumentation setup that corresponds to inspecting a test object or specimen with component geometry 12 according to code requirements 5. This is achieved by integrating PAUT NDT or TFM technical expertise 115 and the decomposition of code requirements 5 into a set of applicative guidelines 110, which encompass the typical aspects covered for the vast majority of inspections. Alternatively, special case inspections that go beyond the scope defined by applicative guidelines 110 can still be addressed through a direct instrument configuration 54 that corresponds to existing practice which necessitates direct involvement of the experienced NDT or TEM engineer for the scan plan generation.

Herein all components of the scan plan generator 100 are types of electronic memories and/or processing device, which can be discrete components or part of an integral device. In some cases, some or all of the components depicted as part of the scan plan generator 100 may be included in a portable testing unit or device. Such a portable testing unit or device can be used by an inspector to perform an inspection of a specimen according to TFM techniques and can perform real-time flaw analysis by comparison of current inspection results with inspection results of a prior inspection, as obtained from the historical configuration data 120.

Illustrative aspects of PAUT NDT or TFM technical expertise 115 that are set by the NDT or TFM engineer in flaw information 120 for generating scan plan 50 further include: beam focalization information, beam aperture information, probe and wedge selection information, preferred scanning method information, range of refraction angles information, and optimization rules and levels of priority information.

Probe and wedge selection are affected by the part's external diameter (OD), the wall thickness (WT), and by the weld orientation and geometry relative to the pipe. For example, a first geometry can be a girth weld between two pipes (typically defined in the art as an AOD inspection), a second geometry can be a longitudinal weld along the pipe axis (defined in the art as an COD inspection), a third geometry can be a complex weld at the junction of two pipes. For a given flaw, the NDT or TFM engineer can maintain a table that associates probe and wedge selection with different wall thicknesses (WT) and external diameters (OD), and flaw type (e.g., side drill holes or flat bottom holes). The table can provide default values corresponding to the recommended practice for most applications.

Another aspect defining the TFM technical expertise is preferred scanning method technical expertise. TFM scanning methods include FMC, plane wave imaging, and virtual source imaging. PAUT scanning methods include the sectoral scan, or S-scan (defined by a preferred S-scanning method technical expertise 115), where the aperture is kept at a fixed position and the refraction angle is swept through a range of angles. Another PAUT scanning method is the linear scan, or E-scan (defined by a preferred E-scanning method technical expertise 115), where the beam refraction angle is kept fixed and scanning is made by lateral movement of the selected probe aperture. Other scanning methods (inspection modes) include pulse echo mode, double-skip mode, or self-tandem mode. Within each of these scanning methods additional parameters, such as the wave sets can be selected. In some cases, certain pulse echo scanning methods are replaced in TFM by one or more of longitudinal-longitudinal (LL), transverse-transverse (TT), and transverse-transverse-transverse-transverse (TTTT) wave sets and the self-tandem mode includes transverse-transverse-transverse (TTT), transverse-longitudinal-transverse (TLT), longitudinal-longitudinal-transverse (LLT), longitudinal-longitudinal-longitudinal (LLL), longitudinal-transverse-transverse (LTT), and transverse-transverse-longitudinal (TTL) wave sets. A given TFM scan plan includes a selection of one of these scanning methods and the specific wave set of the selected scanning method.

Figure 2:
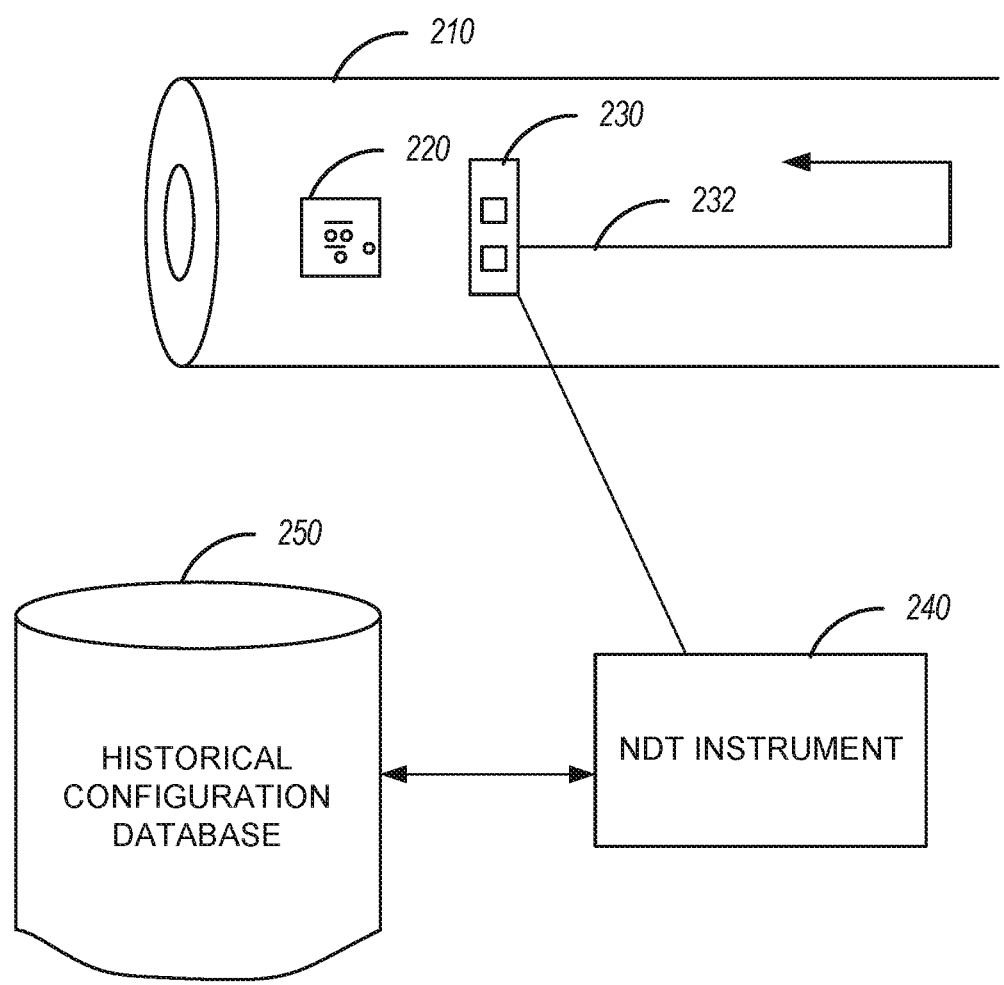
FIG. 2 is an example application for conducting a scan plan, according to some implementations of the present disclosure.

In some implementations, a user (e.g., a scan planner) may use the NDT tag data 14 to assist the user in generating a scan plan and performing an inspection of a specimen 210 (e.g., a pipe elbow or a weld). For example, as shown in FIG. 2, a user (e.g., an inspector different from the scan planner) may use an electronic tool, such as NUT instrument 240, to identify a tag, barcode, serial number or other unique identifier 220 of a specimen 210 under consideration. In some cases, the NDT instrument 240 can capture an image of the identifier of the specimen 210. Image recognition techniques may be employed to retrieve the identifier 220 from the image and obtain the unique sequence of numbers corresponding to the specimen 210. In some cases, a user (e.g., an inspector) may use an RFID reader in the NUT instrument 240 to capture data stored in an RFID tag that is permanently affixed to the specimen 210. The RFID reader can then retrieve the unique sequence of numbers corresponding to the specimen 210 from the RFID tag data. In some cases, a mechanical probe 230 can be placed on the specimen. The mechanical probe 230 may include a camera that scans images of an area around the probe. The images can be processed by the probe to identify a tag or identifier 220 of the specimen. Once the image that includes the tag or identifier 220 is found, the image is processed to retrieve the unique sequence of numbers corresponding to the specimen from the tag (e.g., by retrieving a serial number from the tag or barcode).

After obtaining the unique identifier of the specimen, the electronic tool, such as the NDT instrument 240, or the mechanical probe 230 placed on the specimen 210, can send the unique identifier of the specimen to a remote database. In some cases, the unique identifier is sent to the remote database automatically after the unique identifier is detected. In some cases, the unique identifier is sent to the remote database in response to user input confirming this action from a displayed prompt. For example, the unique identifier may be sent over the Internet or over a dedicated closed network to the historical configuration database 250. The remote historical configuration database 250 may include historical configuration data 120. The historical configuration data 120 associates one or more previous configuration information (e.g., scan plan parameters, setup information, probe positioning information, inspection results, flaw information, etc.) with each the unique identifier of each specimen. Specifically, after a given scan plan is created and executed to perform an inspection of a given specimen, all or some of the parameters of the scan plan (e.g., beam type, probe type used, results of the inspection, flaw information, position information for the probe, etc.) are retrieved and stored in the historical configuration data 120 in association with a unique identifier of the specimen.

In some implementations, a specimen is being inspected for the first time (i.e., there may be no historical configuration data stored for the specimen or device). In such cases, the historical configuration data 120 may not include a unique identifier for the specimen. In response, one or more processors at the remote historical configuration database 250 may generate a random sequence of numbers to create a unique identifier for the specimen. The remote historical configuration database 250 provides the unique identifier to the NDT instrument 240 or computer of an operator or user or inspector in the field who is performing or who has performed the inspection of the new specimen that is inspected for the first time. The operator may then print out or create a tag (e.g., an RFID tag) that includes the unique identifier. The operator may then permanently affix the tag (e.g., with screws and/or glue) to the new specimen. This unique identifier may be stored in a remote location (e.g., a cloud server) and is accessible to the scan planner to retrieve results of the current inspection or other configuration information. These results or other configuration information may be associated with the unique identifier to generate the historical configuration data for the specimen.

in some cases, the tag is generated prior to executed the inspection of the new specimen. Specifically, the tag can be generated and affixed to the 10 specimen 210 before a mechanical probe 230 starts automatically moving along the specimen to conduct the inspection. The mechanical probe can capture an image or location of the tag that is affixed to the specimen to identify the 3D positioning of the tag. Using the 3D positioning of the tag, the mechanical probe computes the point of origin of the probe on the specimen and stores a path 232 that the mechanical probe traverses relative to the 3D positioning of the tag and the point of origin of the mechanical probe. The 3D positioning of the tag, the 3D point of origin of the mechanical probe and the points along which the mechanical probe traverse to form an inspection path 232 are all stored in the historical configuration data 120 in association with the unique identifier of the specimen.

In the future, when a new scan is being executed for the specimen, the tag can be read by the probe 230 or NDT instrument 240 and used to retrieve the previously used configuration data to generate new configuration data for performing an inspection of the specimen 210. The previously used configuration data can be used as new configuration data to perform a new inspection using the new configuration data or may be adjusted to generate new configuration to improve the scan plan that is executed to perforin the new inspection. For example, the previously traversed path 232, beam parameters, and other scan plan parameters can be adjusted to account for new environmental conditions of the specimen to generate new configuration. In some cases, the previously used configuration data is retrieved by a server and is used to compute a new scan plan (e.g., generate new configuration) for the specimen 210 by the server. The server may then provide the new scan plan (e.g., the generate new configuration) to the NDT instrument 240 to execute and perform an inspection of the specimen 210. In some cases, the previously used configuration data is retrieved by a server and is provided to the NDT instrument 240. The NDT instrument 240 locally computes a new scan plan (e.g., generates new configuration) for the specimen 210 based on the previously used configuration data. The NDT instrument 240 then executes the scan plan to perform an inspection of the specimen 210 according to the new configuration data.

In some implementations, the mechanical probe 230 that is placed on the specimen 210 uses the new configuration data to position itself on the specimen relative to a position of the unique identifier 220. Specifically, the mechanical probe 230 obtains the 3D point of origin of mechanical probe 230 previously used to perform an inspection of the specimen 210. The mechanical probe 230 determines its current 3D placement on the specimen 210 relative to the unique identifier 220. The mechanical probe 230 automatically moves itself in 3D space to align its current 3D placement with the 3D point of origin of the mechanical probe 230 previously used to perform an inspection of the specimen 210 based on data contained in the new configuration data. In response to detecting that the probe 230 is aligned in 3D space at the same 3D point of origin of the mechanical probe 230 previously used to perform an inspection of the specimen 210, the probe 230 is ready to perform in the inspection according to the new configuration data. In some cases, the probe 230 begins executing the scan plan and automatically moving along the specimen 210 following the same path 232 that is retrieved from the configuration data and included in the new configuration data. In some cases, an inspector prompts the device at different points along the scan plan to continue performing the scan and/or the inspector checks at certain points along the scan plan that the new and old scan plans match up. In this way, the probe 230 performs an inspection of the specimen 210 in an identical manner as was previously done in a prior inspection of the specimen 210 (e.g., the new configuration data is the same as the historical configuration data).

The 3D positioning information can be determined using GPS coordinates or by computing a 3D location relative to a known 2D or 3D location of the unique identifier 220.

One or more parameters of a scan plan (e.g., a type of flaw to be detected, a spatial extent of the flaw, a size of a reflector, a geometry of the reflector, an orientation of the reflector, a specimen material, an acoustic velocity within the specimen, a specimen thickness, a weld description comprising a weld bevel angle, a probe frequency, a count of elements, a pitch of acoustic transducer elements and elements geometry, separation distance and size of acoustic transducer elements, an acoustic transducer assembly wedge angle, an acoustic transducer assembly wedge material and/or an acoustic transducer assembly wedge geometry) can be retrieved from the historical configuration data 120 based on the tag information. In some cases, these scan plan parameters are stored in the historical configuration data 120 according to a standardized format. In this way, when a new inspection of a specimen is completed or being performed, the scan plan parameters and results can be tabulated and formatted according to the standardized format and stored in the historical configuration data 120. For example, the standardized format in which the data is stored includes any one of a computer aided design (CAD) drawing of the specimen, previous inspection data, previous inspection setup data, previous inspection instrumentation, position referencing of an inspection map versus a position of the tag, or any isometric drawing of the specimen. Any one of the parameters stored in the historical configuration data 120 or all of the parameters together, previously used to inspect the specimen 210, can be used to generate a new scan plan (e.g., generate new configuration) and perform a new inspection of the specimen 210.

In some embodiments, the NDT instrument 240 may create a digital representation of the specimen using the scan plan parameters obtained from the configuration data 120. For example, the NDT instrument 240 may retrieve a CAD drawing of the specimen from the configuration data 120. The NDT instrument 240 may position ultrasonic data or eddy current surface data over the digital representation of the specimen to determine a position for the probe to perform the inspection or to analyze results of the current inspection of the specimen. In some cases, the new inspection may be performed for a twin of the specimen 210 for which the prior inspection was performed. The twin devices may be the same devices or specimen or may be similar devices or specimen (e.g., the devices need not be identical matches). For example, two specimens may be produced by the same company or at about the same time. A first of the specimens may be inspected and the configuration data relating to the inspection may be stored in the configuration data 120. In some cases, the configuration data 120 may be stored in association with a unique identifier of the two specimens. In such cases, the unique identifier may include an index that individually references the two specimens. When the second of the specimens is inspected, the configuration data used to inspect the first specimen may be retrieved, such as by using a unique identifier for the two specimens and accessing the index of the first specimen, and used to generate a scan plan and inspection of the second specimen. The inspection results of the second specimen are also stored in the configuration data 120 in association with the common unique identifier of the two specimen at the index location of the second specimen. This reduces the amount of time and cost it takes to produce a scan plan for a specimen by providing a simple, quick and efficient way to retrieve previously used configuration data of one specimen to generate and execute a new scan plan for another specimen.

In some implementations, a first entity may create a scan plan for the specimen 210. The first entity may execute the scan plan to perform an inspection of the specimen 210. Once the results of the inspection are complete, all of the parameters of the scan plan and the results of the inspection are tabulated in a standardized format and stored in historical configuration data 120. The results may identify a type, size and location of a flaw in the specimen 210. The results may identify a plurality of flaws and include data about those flaws in relation to one another. At a later time, such as one or more years later, a second entity may be requested to perform an inspection of the specimen 210. Rather than creating a new scan plan from scratch, the second entity may use an NDT instrument 240 to retrieve data that is associated with the unique identifier 220 of the specimen 210. The data (e.g., the serial number) of the unique identifier 220 of the specimen 210 may be provided to a server and used to access the scan plan parameters and inspection results generated by the first entity. The server of the second entity may use all or some of the retrieved scan plan information to generate a new scan plan (e.g., generate new configuration) for inspecting the specimen 210. In some cases, the server may instruct the NDT instrument 240 of the second entity to perform the inspection of the specimen 210 using the same parameters as that which was used by the first entity.

The results of the inspection performed by the second entity can be compared (in real-time or after completing the inspection) with the results obtained by inspection performed by the first entity. The results can be compared locally by the NDT instrument 240 or by a server associated with the second entity. In some implementations, the NDT instrument 240 identifies flaw positioning information of a flaw (e.g., crack or corrosion) from the historical configuration data 120. The NDT instrument 240, when the probe 230 reaches a position corresponding to the flaw positioning information, starts comparing the flaw characteristics from the previous inspection with the current flaw characteristics. For example, the NDT instrument 240 can, in real-time, measure whether the flaw has increased in size or stayed relatively the same. If the flaw has increased in size or changed by more than a threshold amount, the NDT instrument 240 may alert the operator that the specimen 210 is failing the inspection or that an inspection error is present (e.g., a signal not related to the specimen that is indicative of a lack of couplant or a dead element). In some cases, the historical configuration data 120 (or portion thereof) is compared with the results of the new inspection to perform signal processing, such as to increase signal-to-noise ratio (SNR) by removing geometry related echoes.

In some embodiments, the NDT instrument 240 of the second entity or a server of the second entity may obtain results from the current inspection and the results from one or more prior inspections of the specimen 210. Specifically, flaw information may be obtained from the current inspection and the one or more previously performed inspections. The NDT instrument 240 of the second entity or a server of the second entity may apply one or more models to the flaw information from the current inspection and the one or more prior inspections to analyze development of the flaw over time. In some cases, future flaw information can be generated or predicted based on an output of the one or more models. Using this future flaw information, the second entity may recommend a plan to address the flaw or may determine how much longer the specimen can be used before the specimen fails inspection.

Figure 3:
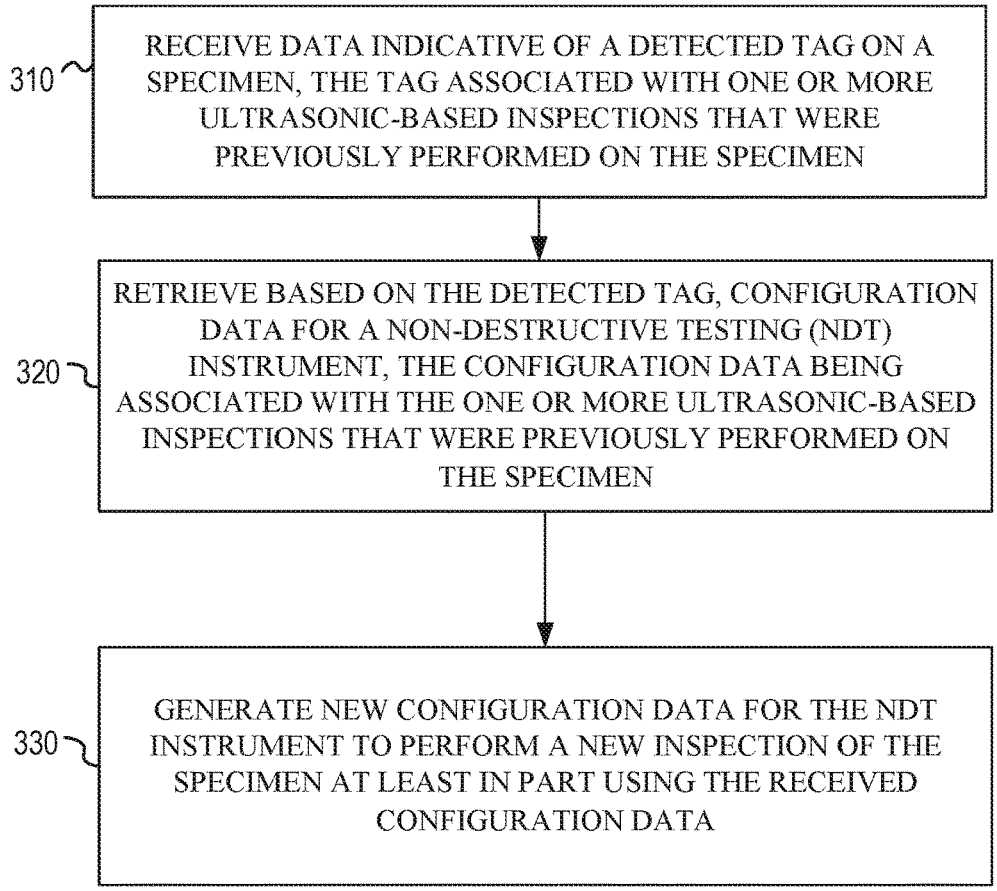
FIG. 3 illustrates a method for conducting a scan plan, according to some implementations of the present disclosure.

FIG. 3 is a flowchart illustrating example operations for conducting a scan plan and inspection of a specimen by performing process 300, according to example implementations. The process 300 may be embodied in computer-readable instructions for execution by one or more processors such that the operations of the process 300 may be performed in part or in whole by the functional components of the system 100; accordingly, the process 300 is described below by way of example with reference thereto. However, in some implementations, at least some of the operations of the process 300 may be deployed on various other hardware configurations. The process 300 is therefore not intended to be limited to the system 100 and can be implemented in whole, or in part, by any other component. Some or all of the operations of process 300 can be in parallel, out of order, or entirely omitted.

At operation 310, an NUT instrument 240 or a server receives data indicative of a detected tag on a specimen, the tag associated with one or more ultrasonic-based inspections that were previously performed on the specimen. For example, the NDT instrument 240 may capture an image of a tag permanently affixed to the specimen and use object recognition to obtain a serial number associated with the tag. In some cases, the NDT instrument 240 is a RFID reader that reads an RFID tag that is permanent affixed to the specimen to obtain the unique identifier of the specimen. The NUT instrument 240 provides this unique identifier to the server as the data indicative of the detected tag. In some cases, the NUT instrument 240 provides one or more images of the specimen that include the tag and the server analyzes the images to obtain the unique identifier of the specimen.

At operation 320, the NDT instrument 240 or the server retrieves based on the detected tag, configuration data for the NDT instrument, the configuration data being associated with the one or more ultrasonic-based inspections that were previously performed on the specimen. For example, the server or the NDT instrument 240 can obtain previously used configuration data that is associated with the unique identifier of the specimen from the historical configuration data 120.

At operation 330, the NDT instrument 240 or the server generate new configuration data for the NDT instrument to perform a new inspection of the specimen at least in part using the received configuration data. For example, the position information of a mechanical probe previously used to perform an inspection of the specimen can be used to generate new configuration that controls a current position of the mechanical probe to follow the same path as the probe in the prior inspection. In some cases, the prior configuration data scan plan parameters are adjusted to account for new environmental conditions or to improve some or all portions of the previous scan plan to generate new configuration which is then used to execute a new inspection.

Figure 4:
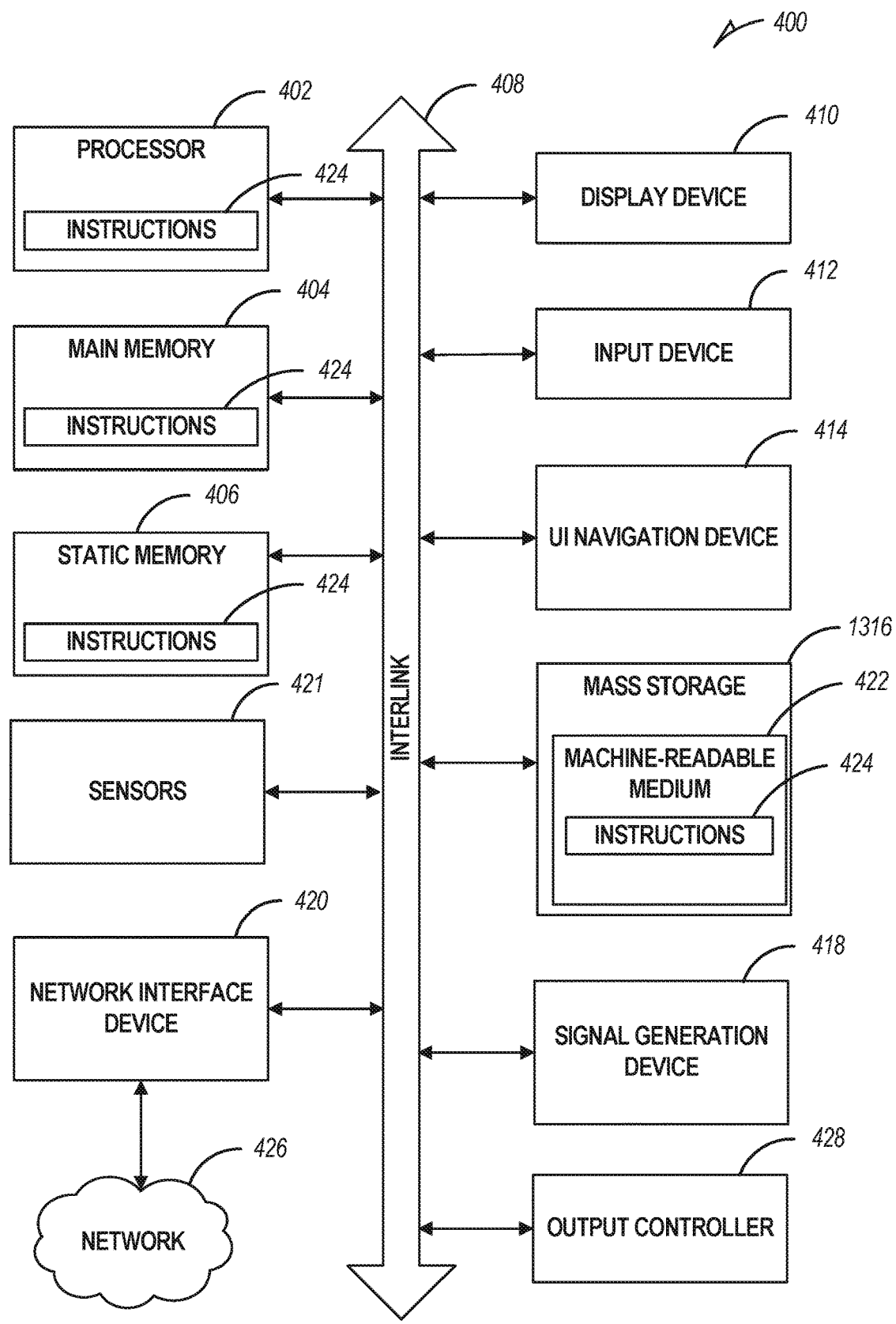
FIG. 4 illustrates an exemplary block diagram of a machine on which one or more of the methods as discussed herein can be implemented.

FIG. 4 illustrates a block diagram of an implementation of a machine 400 on which one or more of the methods as discussed herein can be implemented. 20 In one or more implementations, one or more items of the image processing device 112 can be implemented by the machine 400. In one or more implementations, the machine 400 operates as a standalone device or may be connected (e.g., networked) to other machines. In one or more implementations, the image processing device 112 can include one or more of the items of the machine 400. In a networked deployment, the machine 400 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 400 includes processing circuitry 402 (e.g., a CPU, a graphics processing unit (GPU), an ASIC, circuitry, such as one or more transistors, resistors, capacitors, inductors, diodes, logic gates, multiplexers, buffers, modulators, demodulators, radios (e.g., transmit or receive radios or transceivers), sensors 421 (e.g., a transducer that converts one form of energy (e.g., light, heat, electrical, mechanical, or other energy) to another form of energy), or the like, or a combination thereof), a main memory 404 and a static memory 406, which communicate with each other via a bus 408. The machine 400 (e.g., computer system) may further include a video display unit 410 (e.g., a liquid crystal display (LCD) or a cathode ray tube (CRT)). The machine 400 also includes an alphanumeric input device 412 (e.g., a keyboard), a user interface (UI) navigation device 414 (e.g., a mouse), a disk drive or mass storage unit 416, a signal generation device 418 (e.g., a speaker), and a network interface device 420.

The disk drive unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the machine 400, the main memory 404 and the processor 402 also constituting machine-readable media.

The machine 400 as illustrated includes an output controller 428. The output controller 428 manages data flow to/from the machine 400. The output controller 428 is sometimes called a device controller, with software that directly interacts with the output controller 428 being called a device driver.

While the machine-readable medium 422 is shown in an implementation to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), EEPROM, and flash memory devices; magnetic disks such as internal hard disks and removable disks; magneto-optical disks; and CD-ROM and DVD-ROM disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

Additional Notes

The above detailed description includes references to the accompanying drawings, which form a part of the detailed description. The drawings show, by way of illustration but not by way of limitation, specific implementations in which the disclosure can be practiced. These implementations are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the disclosure or in the implementations thereof, as is common in patent documents, to include one or more than one or more of the elements, independent of any other instances or usages of "at least one or one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising," "including," and "having" are intended to be open-ended to mean that there may be additional elements other than the listed elements, such that after such a term (e.g., comprising, including, having) in a claim are still deemed to fall within the scope of that claim. Moreover, in the following claims, the terms "first," "second," and "third," and so forth, are used merely as labels, and are not intended to impose numerical requirements on their objects.

Implementations of the disclosure may be implemented with computer-executable instructions. The computer-executable instructions (e.g., software code) may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other implementations of the disclosure may include different computer-executable instructions or components having more or less functionality than illustrated and described herein.

Method examples (e.g., operations and functions) described herein can be machine or computer-implemented at least in part (e.g., implemented as software code or instructions). Some examples can include a computer-readable medium or machine-readable medium encoded with instructions operable to configure an electronic device to perform methods as described in the above examples. An implementation of such methods can include software code, such as microcode, assembly language code, a higher-level language code, or the like (e.g., "source code"). Such software code can include computer readable instructions for performing various methods (e.g., "object" or "executable code"). The software code may form portions of computer program products. Software implementations of the implementations described herein may be provided via an article of manufacture with the code or instructions stored thereon, or via a method of operating a communication interface to send data via a communication interface (e.g., wirelessly, over the internet, via satellite communications, and the like).

Further, the software code may be tangibly stored on one or more volatile or non-volatile computer-readable storage media during execution or at other times. These computer-readable storage media may include any mechanism that stores information in a form accessible by a machine (e.g., computing device, electronic system, and the like), such as, but are not limited to, floppy disks, hard disks, removable magnetic disks, any form of magnetic disk storage media, CD-ROMS, magnetic-optical disks, removable optical disks (e.g., compact disks and digital video disks), flash memory devices, magnetic cassettes, memory cards or sticks (e.g., secure digital cards), RAMs (e.g., CMOS RAM and the like), recordable/non-recordable media (e.g., read only memories (ROMs)), EPROIVIS, EEPROMS, or any type of media suitable for storing electronic instructions, and the like. Such computer readable storage medium coupled to a computer system bus to be accessible by the processor and other parts of the OIS.

In various implementations of the disclosure, the method of creating a component or module can be implemented in software, hardware, or a combination thereof. The methods provided by various implementations of the present disclosure, for example, can be implemented in software by using standard programming languages such as, for example, C, C++, Java, Python, and the like; and combinations thereof. As used herein, the terms "software" and "firmware" are interchangeable, and include any computer program stored in memory for execution by a computer.

A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general purpose computer selectively activated or reconfigured by a computer program stored in the computer. The order of execution or performance of the operations in implementations of the disclosure illustrated and described herein is not essential, unless otherwise specified. That is, the operations may be performed in any order, unless otherwise specified, and implementations of the disclosure may include additional or fewer operations than those disclosed herein. For example, it is contemplated that executing or performing a particular operation before, contemporaneously with, or after another operation is within the scope of aspects of the disclosure.

In view of the above, it will be seen that the several objects of the disclosure are achieved and other advantageous results attained. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The above description is intended to be illustrative, and not restrictive. For example, the above-described examples (or one or more aspects thereof) may be used in combination with each other. In addition, many modifications may be made to adapt a particular situation or material to the teachings of the disclosure without departing from its scope. While the dimensions, types of materials and coatings described herein are intended to define the parameters of the disclosure, they are by no means limiting and are exemplary implementations. Many other implementations will be apparent to those of skill in the art upon reviewing the above description. The scope of the disclosure should, therefore, be determined 25 with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description, with each claim standing on its own as a separate implementation. The scope of the disclosure should be determined with reference to the appended claims, along with the full scope of equivalents to which such claims are entitled.

The Abstract is provided to allow the reader to quickly ascertain the nature of the technical disclosure. It is submitted with the understanding that it will not be used to interpret or limit the scope or meaning of the claims.

What is claimed is:

1. A method for conducting an ultrasonic-based inspection, the method comprising:
    receiving, by one or more processors, data representing a physical tag that is physically placed on a specimen, the physical tag being associated with one or more ultrasonic-based inspections that were previously performed on the specimen, the data representing the physical tag being received in response to an interaction between a component of a non-destructive testing (NDT) instrument and the physical tag;
    after receiving the data representing the physical tag in response to the interaction between the component of the NDT instrument and physical tag, retrieving, by the one or more processors, configuration data for the NDT instrument using the data representing the physical tag, the configuration data being associated with the one or more ultrasonic-based inspections that were previously performed on the specimen;
    generating, by the one or more processors, new configuration data for the NDT instrument to perform a new inspection of the specimen at least in part using the received configuration data; and
    performing the new inspection of the specimen based on spatially positioning the NDT instrument relative to a position of the physical tag on the specimen.

2. The method of claim 1, further comprising performing the new inspection of the specimen using the configured NDT instrument, wherein the ultrasonic-based inspections include a phased array inspection.

3. The method of claim 1, wherein the configuration data includes position information for placement of the NDT instrument, and wherein the NDT instrument comprises a Phased Array Ultrasonic Testing (PAUT) probe and scanner, further comprising updating the configuration data based on performing the new inspection of the specimen.

4. The method of claim 1, wherein the configuration data includes a previously used reference starting position relative to the specimen and one or more scan plan parameters.

5. The method of claim 4, wherein the one or more scan plan parameters comprises at least one of:
    a type of flaw to be detected,
    a spatial extent of the flaw,
    a size of a reflector,
    a geometry of the reflector,
    an orientation of the reflector,
    a specimen material,
    an acoustic velocity within the specimen,
    a specimen thickness,
    a weld description comprising a weld bevel angle,
    a probe frequency,
    a count of elements,
    a pitch of acoustic transducer elements and elements geometry,
    separation distance and size of acoustic transducer elements,
    an acoustic transducer assembly wedge angle,
    an acoustic transducer assembly wedge material,
    an acoustic transducer assembly wedge geometry, or
    an inspection mode for the NDT instrument.

6. The method of claim 1, wherein the configuration data is stored in a standardized format and comprises at least one of:
    a computer aided design (CAD) drawing of the specimen,
    previous inspection data,
    previous inspection setup data,
    previous inspection instrumentation, or
    position referencing of an inspection map versus a position of the tag.

7. The method of claim 1, wherein the physical tag is permanently affixed to the specimen, and wherein the component of the NDT instrument comprises a camera, the interaction comprising capturing an image of the physical tag.

8. The method of claim 1, wherein an entity that performs the new inspection differs from one or more entities that performed the one or more ultrasonic-based inspections that were previously performed on the specimen.

9. The method of claim 1, wherein the new inspection is performed one or more years after the one or more ultrasonic-based inspections that were previously performed on the specimen, and wherein an entity that performs the new inspection differs from one or more entities that performed the one or more ultrasonic-based inspections that were previously performed on the specimen.

10. The method of claim 1, wherein the generating is performed by a server or the NDT instrument.

11. The method of claim 1, further comprising comparing data associated with a flaw in the specimen resulting from the new inspection with historical data associated with the flaw in the specimen that resulted from performing the one or more ultrasonic-based inspections that were previously performed on the specimen, the flaw comprising at least one of a crack or corrosion of the specimen.

12. The method of claim 11, further comprising obtaining the historical data associated with the flaw in the specimen that resulted from performing the one or more ultrasonic-based inspections that were previously performed on the specimen based on the tag.

13. The method of claim 11, further comprising applying one or more models to analyze development of the flaw over time based on the data associated with the flaw in the specimen resulting from the new inspection and the historical data associated with the flaw in the specimen that resulted from performing the one or more ultrasonic-based inspections that were previously performed on the specimen.

14. The method of claim 13, further comprising predicting future flaw data based on the applied one or more models.

15. The method of claim 1, further comprising detecting evolving of a flaw in the specimen in real-time or an inspection operation error based on comparing of data associated with the flaw in the specimen resulting from the new inspection and historical data.

16. The method of claim 15, wherein the inspection operation error includes a signal not related to the specimen that is indicative of a lack of couplant or a dead element.

17. The method of claim 16, further comprising detecting evolving of the flaw in real-time or an inspection operation error based on comparing of the data associated with the flaw in the specimen resulting from the new inspection and the historical data, wherein the inspection operation error includes a signal not related to the specimen that is indicative of a lack of couplant or a dead element.

18. The method of claim 1, wherein the physical tag comprises a radio-frequency identifier (RFID) tag, the component comprises an RFID reader, further comprising obtaining a unique code represented by the tag using the RFID reader included in the NDT instrument, and wherein a position of the NDT instrument relative to the tag is set based on the RFID tag.

19. The method of claim 1, wherein detecting the tag comprises:
receiving imaging information representing the physical tag;
processing the imaging information to retrieve a unique code represented by the physical tag;
accessing a database, remote from the NDT instrument, to retrieve the configuration data based on the unique code; and
automatically adjusting a current position in a three-dimensional (3D) positioning system of the NDT instrument based on the configuration data to perform the new inspection.

20. The method of claim 19, wherein the NDT instrument comprises a camera, and further comprising:
placing the NDT instrument on the specimen;
capturing an image including the physical tag using the camera of the NDT instrument;
providing the captured image as the imaging information; and
positioning the NDT instrument relative to the image that includes the tag to follow a scan path, wherein a position of the tag in the 3D positioning system is determined using the image captured using the camera of the NDT instrument.

21. A system for conducting an ultrasonic-based inspection, the system comprising:
one or more processors configured to perform operations comprising:
receiving data representing a physical tag that is physically placed on a specimen, the physical tag being associated with one or more ultrasonic-based inspections that were previously performed on the specimen, the data representing the physical tag being received in response to an interaction between a component of a non-destructive testing (NDT) instrument and the physical tag;
after receiving the data representing the physical tag in response to the interaction between the component of the NDT instrument and physical tag, retrieving configuration data for the NDT instrument using the data representing the physical tag, the configuration data being associated with the one or more ultrasonic-based inspections that were previously performed on the specimen;
generating new configuration data for the NDT instrument to perform a new inspection of the specimen at least in part using the received configuration data; and
performing the new inspection of the specimen based on spatially positioning the NDT instrument relative to a position of the tag on the specimen.

22. A non-transitory computer-readable medium comprising non-transitory computer-readable instructions that, when executed by one or more processors, cause the one or more processors to perform operations comprising:
receiving data representing a physical tag that is physically placed on a specimen, the physical tag being associated with one or more ultrasonic-based inspections that were previously performed on the specimen, the data representing the physical tag being received in response to an interaction between a component of a non-destructive testing (NDT) instrument and the physical tag;
after receiving the data representing the physical tag in response to the interaction between the component of the NDT instrument and physical tag, retrieving configuration data for the NDT instrument using the data representing the physical tag, the configuration data being associated with the one or more ultrasonic-based inspections that were previously performed on the specimen;
generating new configuration data for the NDT instrument to perform a new inspection of the specimen at least in part using the received configuration data; and
performing the new inspection of the specimen based on spatially positioning the NDT instrument relative to a position of the tag on the specimen.

* * * * *